(12) United States Patent
Marker et al.

(10) Patent No.: US 8,003,836 B2
(45) Date of Patent: *Aug. 23, 2011

(54) PRODUCTION OF DIESEL FUEL FROM BIORENEWABLE FEEDSTOCKS

(75) Inventors: Terry L. Marker, Palos Heights, IL (US); Peter Kokayeff, Naperville, IL (US); Suheil F. Abdo, Lincolnshire, IL (US); Tom N. Kalnes, LaGrange, IL (US)

(73) Assignee: UOP LLC, Des Plaines, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/899,221

(22) Filed: Oct. 6, 2010

(65) Prior Publication Data

US 2011/0024327 A1 Feb. 3, 2011

Related U.S. Application Data

(62) Division of application No. 12/193,149, filed on Aug. 18, 2008.

(60) Provisional application No. 60/973,797, filed on Sep. 20, 2007.

(51) Int. Cl.
*C07C 4/00* (2006.01)

(52) U.S. Cl. ........ 585/240; 585/242; 585/266; 585/362; 585/638

(58) Field of Classification Search .................. 585/240, 585/242, 362, 266, 638
See application file for complete search history.

(56) References Cited

U.S. PATENT DOCUMENTS

| | | | | |
|---|---|---|---|---|
| 5,705,722 | A * | 1/1998 | Monnier et al. | 585/240 |
| 7,511,181 | B2 * | 3/2009 | Petri et al. | 585/240 |
| 7,550,634 | B2 * | 6/2009 | Yao et al. | 585/240 |
| 7,754,931 | B2 * | 7/2010 | Monnier et al. | 585/240 |
| 7,816,570 | B2 * | 10/2010 | Roberts et al. | 585/240 |
| 2006/0186020 | A1 * | 8/2006 | Gomes | 208/46 |
| 2006/0264684 | A1 * | 11/2006 | Petri et al. | 585/250 |
| 2007/0260102 | A1 * | 11/2007 | Duarte Santiago et al. | 585/733 |

FOREIGN PATENT DOCUMENTS

EP 1 396 531 * 3/2004

* cited by examiner

*Primary Examiner* — N. Bhat
(74) *Attorney, Agent, or Firm* — Maryann Maas

(57) ABSTRACT

A process has been developed for producing diesel boiling range fuel from renewable feedstocks such as plant oils, animal fats and oils, and greases. The process involves treating a renewable feedstock by hydrogenating and deoxygenating to provide a diesel boiling range fuel hydrocarbon product. If desired, the hydrocarbon product can be isomerized to improve cold flow properties. A portion of the hydrocarbon product is recycled to the treatment zone to increase the hydrogen solubility of the reaction mixture.

10 Claims, 3 Drawing Sheets

PRODUCTION OF DIESEL FUEL FROM BIORENEWABLE FEEDSTOCKS

CROSS-REFERENCE TO RELATED APPLICATIONS

This application is a Division of copending application Ser. No. 12/193,149 filed Aug. 18, 2008, which application claims priority from Provisional Application No. 60/973,797 filed Sep. 20, 2007, the contents of which are hereby incorporated by reference in its entirely.

FIELD OF THE INVENTION

This invention relates to a process for producing diesel boiling range hydrocarbons useful as fuel from renewable feedstocks such as the glycerides and free fatty acids found in materials such as plant oils, animal oils, animal fats, and greases. The process involves hydrogenation, decarboxylation, decarbonylation, and/or hydrodeoxygenation and optionally hydroisomerization in one or more steps. The process is operated with a volume ratio of recycle product to feedstock from about 2:1 to about 8:1. The process is operated at a total pressure of from about 1379 kPa absolute (200 psia) to about 4826 kPa absolute (700 psia).

BACKGROUND OF THE INVENTION

As the demand for diesel boiling range fuel increases worldwide there is increasing interest in sources other than petroleum crude oil for producing diesel fuel. One such source is what has been termed biorenewable sources. These biorenewable sources include, but are not limited to, plant oils such as corn, rapeseed, canola, soybean and algal oils, animal fats such as inedible tallow, fish oils and various waste streams such as yellow and brown greases and sewage sludge. The common feature of these sources is that they are composed of glycerides and Free Fatty Acids (FFA). Both of these classes of compounds contain aliphatic carbon chains having from about 8 to about 24 carbon atoms. The aliphatic chains in the glycerides or FFAs can be fully saturated or mono, di or poly-unsaturated.

There are reports in the art disclosing the production of hydrocarbons from oils. For example, U.S. Pat. No. 4,300,009 discloses the use of crystalline aluminosilicate zeolites to convert plant oils such as corn oil to hydrocarbons such as gasoline and chemicals such as para-xylene. U.S. Pat. No. 4,992,605 discloses the production of hydrocarbon products in the diesel boiling range by hydroprocessing vegetable oils such as canola or sunflower oil. Finally, US 2004/0230085 A1 discloses a process for treating a hydrocarbon component of biological origin by hydrodeoxygenation followed by isomerization.

Applicants have developed a process which comprises an optional pretreatment step, and one or more steps to hydrogenate, decarboxylate, decarbonylate, (and/or hydrodeoxygenate) and optionally hydroisomerize the feedstock, and which can be successfully operated at a lower pressure range than previous systems. Employing a volume ratio of recycle hydrocarbon to feedstock ranging from about 2:1 to about 8:1 provides a mechanism to increase the hydrogen solubility in the reaction mixture sufficiently so that the operating pressure of the process may be lowered. The range of successful volume ratios of recycle to feedstock is based upon the desired hydrogen solubility in the reaction mixture. The reaction zone may be operated at a pressure in the range of about 1379 kPa absolute (200 psia) to about 4826 kPa absolute (700 psia).

SUMMARY OF THE INVENTION

The process is for producing a hydrocarbon fraction useful as a diesel fuel from a renewable feedstock and the process comprises treating the renewable feedstock in a reaction zone by hydrogenating and deoxygenating the renewable feedstock at reaction conditions to provide a reaction product comprising a hydrocarbon fraction comprising n-paraffins useful as a diesel boiling range fuel, or fuel blending component, and recycling a portion of the hydrocarbon fraction to the reaction zone wherein the volume ratio of recycle to feedstock is in the range of about 2:1 to about 8:1. Optionally the reaction product may be isomerized to provide an isomerized reaction product.

DETAILED DESCRIPTION OF THE INVENTION

Figure 1:
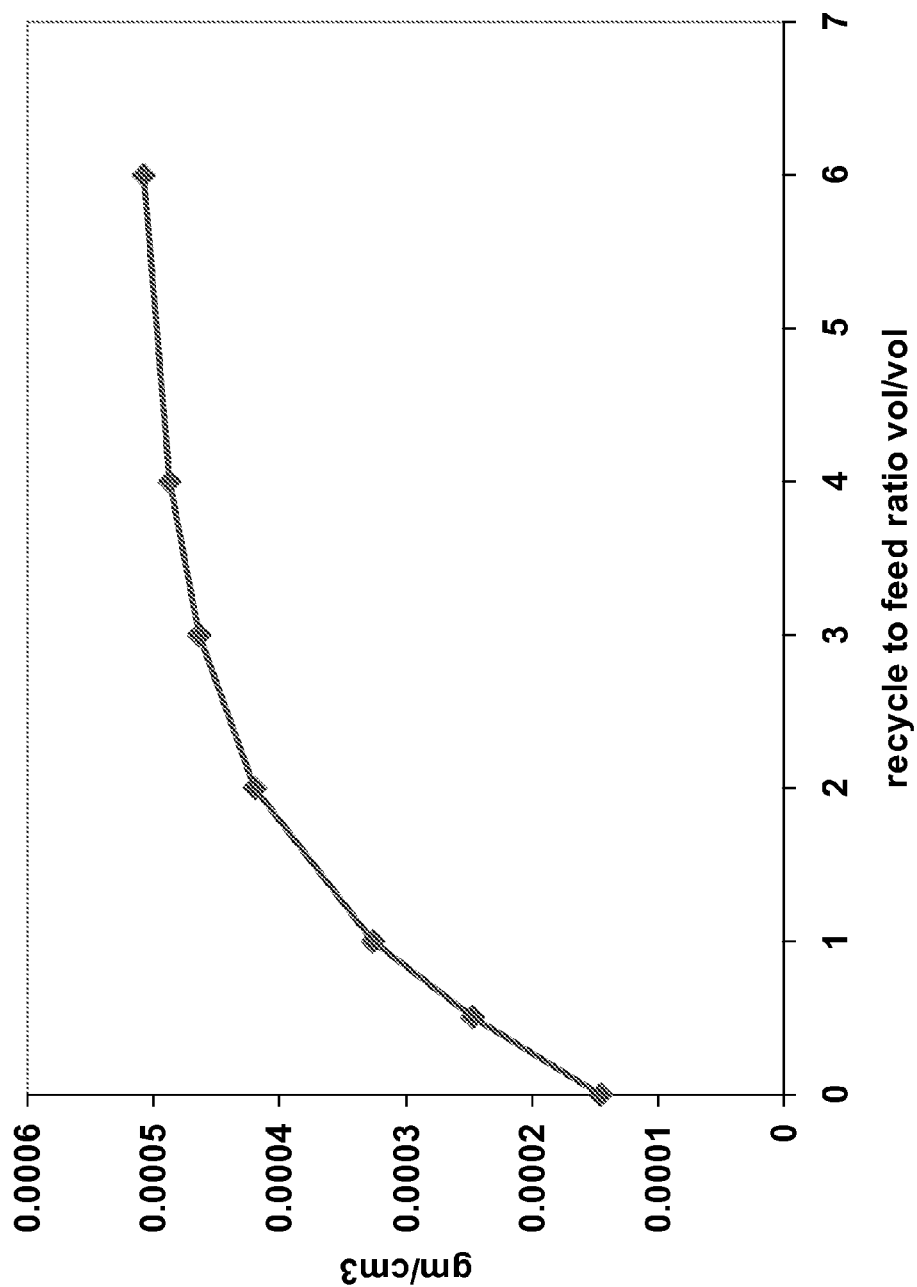
FIG. 1 is a plot of simulation data showing the amount of hydrogen solubility plotted against the recycle to feed ratio.

As stated, the present invention relates to a process for producing a hydrocarbon stream useful as diesel fuel from renewable feedstocks such as those feedstocks originating from plants or animals. The term renewable feedstock is meant to include feedstocks other than those derived from petroleum crude oil. Another term that has been used to describe this class of feedstock is biorenewable fats and oils. The renewable feedstocks that can be used in the present invention include any of those which comprise glycerides and free fatty acids (FFA). Most of the glycerides will be triglycerides, but monoglycerides and diglycerides may be present and processed as well. Examples of these renewable feedstocks include, but are not limited to, canola oil, corn oil, soy oils, rapeseed oil, soybean oil, colza oil, tall oil, sunflower oil, hempseed oil, olive oil, linseed oil, coconut oil, castor oil, peanut oil, palm oil, mustard oil, cottonseed oil, jatropha oil, tallow, yellow and brown greases, lard, train oil, fats in milk, fish oil, algal oil, sewage sludge, and the like. Additional examples of renewable feedstocks include non-edible vegetable oils from the group comprising *Jatropha curcas* (Ratanjoy, Wild Castor, Jangli Erandi), *Madhuca indica* (Mohuwa), *Pongamia pinnata* (Karanji Honge), and *Azadiracta indicia* (Neem). The glycerides and FFAs of the typical vegetable or animal fat contain aliphatic hydrocarbon chains in their structure which have about 8 to about 24 carbon atoms with a majority of the fats and oils containing high concentrations of fatty acids with 16 and 18 carbon atoms. Mixtures or co-feeds of renewable feedstocks and petroleum derived hydrocarbons may also be used as the feedstock. Other feedstock components which may be used, especially as a co-feed component in combination with the above listed feedstocks, include spent motor oils and industrial lubricants, used paraffin waxes, liquids derived from the gasification of coal, biomass, or natural gas followed by a downstream liquefaction step such as Fischer-Tropsch technology, liquids derived from depolymerization, thermal or chemical, of waste plastics such as polypropylene, high density polyethylene, and low density polyethylene; and other synthetic oils generated as byproducts from petrochemical and chemical processes. Mixtures of the above feedstocks may also be used as co-feed components. One advantage of using a co-feed component is the transformation of may have been considered to be a waste product from a petroleum based or other process into a valuable co-feed component to the current process.

Renewable feedstocks that can be used in the present invention may contain a variety of impurities. For example, tall oil is a by product of the wood processing industry and tall oil contains esters and rosin acids in addition to FFAs. Rosin acids are cyclic carboxylic acids. The renewable feedstocks may also contain contaminants such as alkali metals, e.g. sodium and potassium, phosphorous as well as solids, water and detergents. An optional first step is to remove as much of these contaminants as possible. One possible pretreatment step involves contacting the renewable feedstock with an ion-exchange resin in a pretreatment zone at pretreatment conditions. The ion-exchange resin is an acidic ion exchange resin such as Amberlyst™-15 and can be used as a bed in a reactor through which the feedstock is flowed through, either upflow or downflow.

Another possible means for removing contaminants is a mild acid wash. This is carried out by contacting the feedstock with an acid such as sulfuric, nitric or hydrochloric acid in a reactor. The acid and feedstock can be contacted either in a batch or continuous process. Contacting is done with a dilute acid solution usually at ambient temperature and atmospheric pressure. If the contacting is done in a continuous manner, it is usually done in a counter current manner. Yet another possible means of removing metal contaminants from the feedstock is through the use of guard beds which are well known in the art. These can include alumina guard beds either with or without demetallation catalysts such as nickel or cobalt. Filtration and solvent extraction techniques are other choices which may be employed. Hydroprocessing such as that described in U.S. Ser. No. 11/770,826, incorporated by reference, is another pretreatment technique which may be employed.

The feedstock is flowed to a reaction zone comprising one or more catalyst beds in one or more reactors. The term feedstock is meant to include feedstocks that have not been treated to remove contaminants as well as those feedstocks purified in a pretreatment zone. In the reaction zone, the feedstock is contacted with a hydrogenation or hydrotreating catalyst in the presence of hydrogen at hydrogenation conditions to hydrogenate the olefinic or unsaturated portions of the n-paraffinic chains. Hydrogenation or hydrotreating catalysts are any of those well known in the art such as nickel or nickel/molybdenum dispersed on a high surface area support. Other hydrogenation catalysts include one or more noble metal catalytic elements dispersed on a high surface area support. Non-limiting examples of noble metals include Pt and/or Pd dispersed on gamma-alumina. Hydrogenation conditions include a temperature of about 200° C. to about 300° C. and a pressure of about 1379 kPa absolute (200 psia) to about 4826 kPa absolute (700 psia). Other operating conditions for the hydrogenation zone are well known in the art.

The hydrogenation and hydrotreating catalysts enumerated above are also capable of catalyzing decarboxylation, decarbonylation, and/or hydrodeoxygenation of the feedstock to remove oxygen. Decarboxylation, decarbonylation, and hydrodeoxygenation are herein collectively referred to as deoxygenation reactions. Decarboxylation and decarbonylation conditions include a relatively low pressure of about 3447 kPa (500 psia) to about 6895 kPa (1000 psia), a temperature of about 288° C. to about 345° C. and a liquid hourly space velocity of about 1 to about 4 hr$^{-1}$. Since hydrogenation is an exothermic reaction, as the feedstock flows through the catalyst bed the temperature increases and decarboxylation and hydrodeoxygenation will begin to occur. Thus, it is envisioned and is within the scope of this invention that all reactions occur simultaneously in one reactor or in one bed. Alternatively, the conditions can be controlled such that hydrogenation primarily occurs in one bed and decarboxylation and/or hydrodeoxygenation occurs in a second bed. Of course if only one bed is used, then hydrogenation occurs primarily at the front of the bed, while decarboxylation, decarbonylation and hydrodeoxygenation occurs mainly in the middle and bottom of the bed. Finally, desired hydrogenation can be carried out in one reactor, while decarboxylation, decarbonylation, and/or hydrodeoxygenation can be carried out in a separate reactor.

Hydrogen is a reactant in the reactions above, and to be effective, a sufficient quantity of hydrogen must be in solution to most effectively take part in the catalytic reaction. Past processes have operated at high pressures in order to achieve a desired amount of hydrogen in solution and readily available for reaction. If hydrogen is not available at the reaction site of the catalyst, the coke forms on the catalyst and deactivates the catalyst. To solve this problem, the pressure is often raised to insure enough hydrogen is available to avoid coking reactions on the catalyst. However, higher pressure operations are more costly to build and to operate as compared to their lower pressure counterparts. One advantage of the present invention is the operating pressure is in the range of about 1379 kPa absolute (200 psia) to about 4826 kPa absolute (700 psia) which is lower than that found in other previous operations. In another embodiment the operating pressure is in the range of about 2413 kPa absolute (350 psia) to about 4481 kPa absolute (650 psia), and in yet another embodiment operating pressure is in the range of about 2758 kPa absolute (400 psia) to about 4137 kPa absolute (600 psia). Furthermore, the rate of reaction is increased resulting in a greater amount of throughput of material through the reactor in a given period of time. Lower operating pressures provide an additional advantage in increasing the decarboxylation reaction while reducing the hydrodeoxygenation reaction. The result is a reduction in the amount of hydrogen required to remove oxygen from the feedstock component and produce a finished product. Hydrogen can be a costly component of the feed and reduction of the hydrogen requirements is beneficial from an economic standpoint. Hydrogen may be separated from process effluent(s) and recycled to the hydrogenation and deoxygenation zone, or the amount of hydrogen may be in only slight excess, about 5 to about 25%, of the hydrogen requirements of the hydrogenation and deoxygenation reactions and therefore not recycled. Another refinery unit, such as a hydrocracker, may be used as a source of hydrogen, which potentially eliminates the need for a recycle gas compressor.

The desired amount of hydrogen is kept in solution at lower pressures by employing a large recycle of hydrocarbon. Other processes have employed hydrocarbon recycle in order to control the temperature in the reaction zones since the reactions are exothermic reactions. However, the range of recycle to feedstock ratios used herein is set based on the need to control the level of hydrogen in the liquid phase and therefore reduce the deactivation rate. The amount of recycle is determined not on temperature control requirements, but instead, based upon hydrogen solubility requirements. Hydrogen has a greater solubility in the hydrocarbon product than it does in the feedstock. By utilizing a large hydrocarbon recycle the solubility of hydrogen in the liquid phase in the reaction zone is greatly increased and higher pressures are not needed to increase the amount of hydrogen in solution and avoid catalyst deactivation at low pressures. In one embodiment of the invention, the volume ratio of hydrocarbon recycle to feedstock is from about 2:1 to about 8:1, or from about 2:1 to about 6:1. In another embodiment the ratio is in the range of about 3:1 to about 6:1 and in yet another embodiment the ratio is in the range of about 4:1 to about 5:1.

The ranges of suitable volume ratios of hydrocarbon recycle to feedstock was determined using a model simulation where the feedstock would be vegetable oil and the recycle would be normal $C_{17}$ and $C_{18}$ paraffins. The results of the simulation were plotted and are shown in FIG. 1. The simulation test conditions were at 316° C. (600° F.) and 4137 kPa absolute (600 psia). The hydrogen solubility in gm/cm$^3$ (grams hydrogen per cubic centimeter of combined feedstock and recycle) was plotted against the recycle to feed ratio, vol/vol. The results of the simulation show that the hydrogen solubility increases rapidly until about a recycle to feed ratio of about 2:1. Therefore, the suitable ranges for hydrogen solubility begin at about a recycle to feed ratio of about 2:1. From recycle to feed ratios of about 2:1 through 6:1 the simulation showed that the hydrogen solubility remained high. Thus, the specific ranges of vol/vol ratios of recycle to feed is determined based on achieving a suitable hydrogen solubility in the deoxygenation reaction zone.

The reaction product from the deoxygenation reactions in the deoxygenation zone will comprise a liquid portion and a gaseous portion. The liquid portion comprises a hydrocarbon fraction which is essentially all n-paraffins and having a large concentration of paraffins in the range of about 9 to about 18 carbon atoms. Different feedstocks will result in different distributions of paraffins. A portion of this hydrocarbon fraction, after separation, may be used as the hydrocarbon recycle described above. Although this hydrocarbon fraction is useful as a diesel fuel, because it comprises essentially all n-paraffins, it will have poor cold flow properties. If it is desired to improve the cold flow properties of the liquid hydrocarbon fraction, then the entire reaction product can be contacted with an isomerization catalyst under isomerization conditions to at least partially isomerize the n-paraffins to isoparaffins. Catalysts and conditions for isomerization are well known in the art. See for example US 2004/0230085 A1 which is incorporated by reference in its entirety. Isomerization can be carried out in a separate bed of the same reaction zone, i.e. same reactor, described above or the isomerization can be carried out in a separate reactor.

If isomerization is desired, the product of the deoxygenation reaction zone is contacted with an isomerization catalyst in the presence of hydrogen at isomerization conditions to isomerize the normal paraffins to branched paraffins. Only minimal branching is required, enough to overcome cold-flow problems of the normal paraffins. Since attempting for significant branching runs the risk of high degree of undesired cracking, the predominant isomerized product is a mono-branched hydrocarbon.

The isomerization of the paraffinic product can be accomplished in any manner known in the art or by using any suitable catalyst known in the art. Suitable catalysts comprise a metal of Group VIII (IUPAC 8-10) of the Periodic Table and a support material. Suitable Group VIII metals include platinum and palladium, each of which may be used alone or in combination. The support material may be amorphous or crystalline. Suitable support materials include amorphous alumina, amorphous silica-alumina, ferrierite, ALPO-31, SAPO-11, SAPO-31, SAPO-37, SAPO-41, SM-3, MgAPSO-31, FU-9, NU-10, NU-23, ZSM-12, ZSM-22, ZSM-23, ZSM-35, ZSM-48, ZSM-50, ZSM-57, MeAPO-11, MeAPO-31, MeAPO-41, MeAPSO-11, MeAPSO-31, MeAPSO-41, MeAPSO-46, ELAPO-11, ELAPO-31, ELAPO-41, ELAPSO-11, ELAPSO-31, ELAPSO-41, laumontite, cancrinite, offretite, hydrogen form of stillbite, magnesium or calcium form of mordenite, and magnesium or calcium form of partheite, each of which may be used alone or in combination. ALPO-31 is described in U.S. Pat. No. 4,310,440. SAPO-11, SAPO-31, SAPO-37, and SAPO-41 are described in U.S. Pat. No. 4,440,871. SM-3 is described in U.S. Pat. No. 4,943,424; U.S. Pat. No. 5,087,347; U.S. Pat. No. 5,158,665; and U.S. Pat. No. 5,208,005. MgAPSO is a MeAPSO, which is an acronym for a metal aluminumsilicophosphate molecular sieve, where the metal Me is magnesium (Mg). Suitable MeAPSO-31 catalysts include MgAPSO-31. MeAPSOs are described in U.S. Pat. No. 4,793,984, and MgAPSOs are described in U.S. Pat. No. 4,758,419. MgAPSO-31 is a preferred MgAPSO, where 31 means a MgAPSO having structure type 31. Many natural zeolites, such as ferrierite, that have an initially reduced pore size can be converted to forms suitable for olefin skeletal isomerization by removing associated alkali metal or alkaline earth metal by ammonium ion exchange and calcination to produce the substantially hydrogen form, as taught in U.S. Pat. No. 4,795,623 and U.S. Pat. No. 4,924,027. Further catalysts and conditions for skeletal isomerization are disclosed in U.S. Pat. No. 5,510,306, U.S. Pat. No. 5,082,956, and U.S. Pat. No. 5,741,759.

The isomerization catalyst may also comprise a modifier selected from the group consisting of lanthanum, cerium, praseodymium, neodymium, samarium, gadolinium, terbium, and mixtures thereof, as described in U.S. Pat. No. 5,716,897 and U.S. Pat. No. 5,851,949. Other suitable support materials include ZSM-22, ZSM-23, and ZSM-35, which are described for use in dewaxing in U.S. Pat. No. 5,246,566 and in the article entitled "New molecular sieve process for lube dewaxing by wax isomerization," written by S. J. Miller, in Microporous Materials 2 (1994) 439-449. The teachings of U.S. Pat. No. 4,310,440; U.S. Pat. No. 4,440,871; U.S. Pat. No. 4,793,984; U.S. Pat. No. 4,758,419; U.S. Pat. No. 4,943,424; U.S. Pat. No. 5,087,347; U.S. Pat. No. 5,158,665; U.S. Pat. No. 5,208,005; U.S. Pat. No. 5,246,566; U.S. Pat. No. 5,716,897; and U.S. Pat. No. 5,851,949 are hereby incorporated by reference.

U.S. Pat. No. 5,444,032 and U.S. Pat. No. 5,608,134 teach a suitable bifunctional catalyst which is constituted by an amorphous silica-alumina gel and one or more metals belonging to Group VIIIA, and is effective in the hydroisomerization of long-chain normal paraffins containing more than 15 carbon atoms. U.S. Pat. No. 5,981,419 and U.S. Pat. No. 5,968,344 teach a suitable bifunctional catalyst which comprises: (a) a porous crystalline material isostructural with beta-zeolite selected from boro-silicate (BOR—B) and boro-aluminosilicate (Al—BOR—B) in which the molar $SiO_2:Al_2O_3$ ratio is higher than 300:1; (b) one or more metal(s) belonging to Group VIIIA, selected from platinum and palladium, in an amount comprised within the range of from 0.05 to 5% by weight. Article V. Calemma et al., App. Catal. A: Gen., 190 (2000), 207 teaches yet another suitable catalyst.

The isomerization catalyst may be any of those well known in the art such as those described and cited above. Isomerization conditions include a temperature of about 150° C. to about 360° C. and a pressure of about 1034 kPa absolute (150 psia) to about 2068 kPa absolute (300 psia) or about 1724 kPa absolute (250 psia) to about 4726 kPa absolute (700 psia). In another embodiment the isomerization conditions include a temperature of about 300° C. to about 360° C. and a pressure of about 3102 kPa absolute (450 psia) to about 3792 kPa absolute (550 psia). Operating at the low pressures allows for the optional introduction of hydrogen from a hydrogen plant without the use of a make-up compressor. When hydrogen is not recycled, the amount of hydrogen introduced to the isomerization zone would be only slightly greater than that which is consumed, an excess of about 5 to about 25 percent of the consumption requirements. Other operating conditions for the isomerization zone are well known in the art.

Whether isomerization is carried out or not, the final effluent stream, i.e. the stream obtained after all reactions have been carried out, is now processed through one or more separation steps to obtain a purified hydrocarbon stream useful as a diesel boiling range fuel or fuel blending component. Because the final effluent stream comprises both a liquid and a gaseous component, the liquid and gaseous components are separated using a separator such as a cold separator. The separated liquid component comprises the product hydrocarbon stream useful as a diesel fuel. Further separations may be performed to remove naphtha and LPG from the product hydrocarbon stream. The separated gaseous component comprises mostly hydrogen and the carbon dioxide from the decarboxylation reaction. The carbon dioxide can be removed from the hydrogen by means well known in the art, reaction with a hot carbonate solution, pressure swing absorption, etc. Also, absorption with an amine in processes such as described in applications 60/973,792 and 60/973,816 filed on the same day as the present application and hereby incorporated by reference may be employed. If desired, essentially pure carbon dioxide can be recovered by regenerating the spent absorption media. The hydrogen remaining after the removal of the carbon dioxide may be recycled to the reaction zone where hydrogenation primarily occurs and/or to any subsequent beds/reactors.

Finally, a portion of the product hydrocarbon is recycled to the hydrogenating and deoxygenating reaction zone. The recycle stream may be taken from the product hydrocarbon stream after the hydrogenating and deoxygenating reactor(s) and separation form gaseous components, and recycled back to the hydrogenating and deoxygenating reactor(s). Or the recycle stream may be taken from the effluent of a separation unit, such as a hot high pressure separator, located between the deoxygenation reaction zone and the isomerization reaction zone. Although possible, it is less preferred to take the recycle stream from the isomerized product since isomerized products are more susceptible to cracking than the normal paraffins in the hydrogenating and deoxygenating reaction zone. A portion of a hydrocarbon stream from, for example, a hot high pressure separator or a cold high pressure separator, may also be cooled down if necessary and used as cool quench liquid between the beds of the deoxygenation reaction zone to further control the heat of reaction and provide quench liquid for emergencies. The recycle stream may be introduced to the inlet of the deoxygenation reaction zone and/or to any subsequent beds or reactors. One benefit of the hydrocarbon recycle is to control the temperature rise across the individual beds. However, as discussed above, the amount of hydrocarbon recycle herein is determined based upon the desired hydrogen solubility in the reaction zone. Increasing the hydrogen solubility in the reaction mixture allows for successful operation at lower pressures, and thus reduced cost. Operating with high recycle and maintaining high levels of hydrogen in the liquid phase helps dissipate hot spots at the catalyst surface and reduces the formation of undesirable heavy components which lead to coking and catalyst deactivation.

The following examples are presented in illustration of this invention and are not intended as undue limitations on the generally broad scope of the invention as set out in the appended claims.

EXAMPLE

Figure 2:
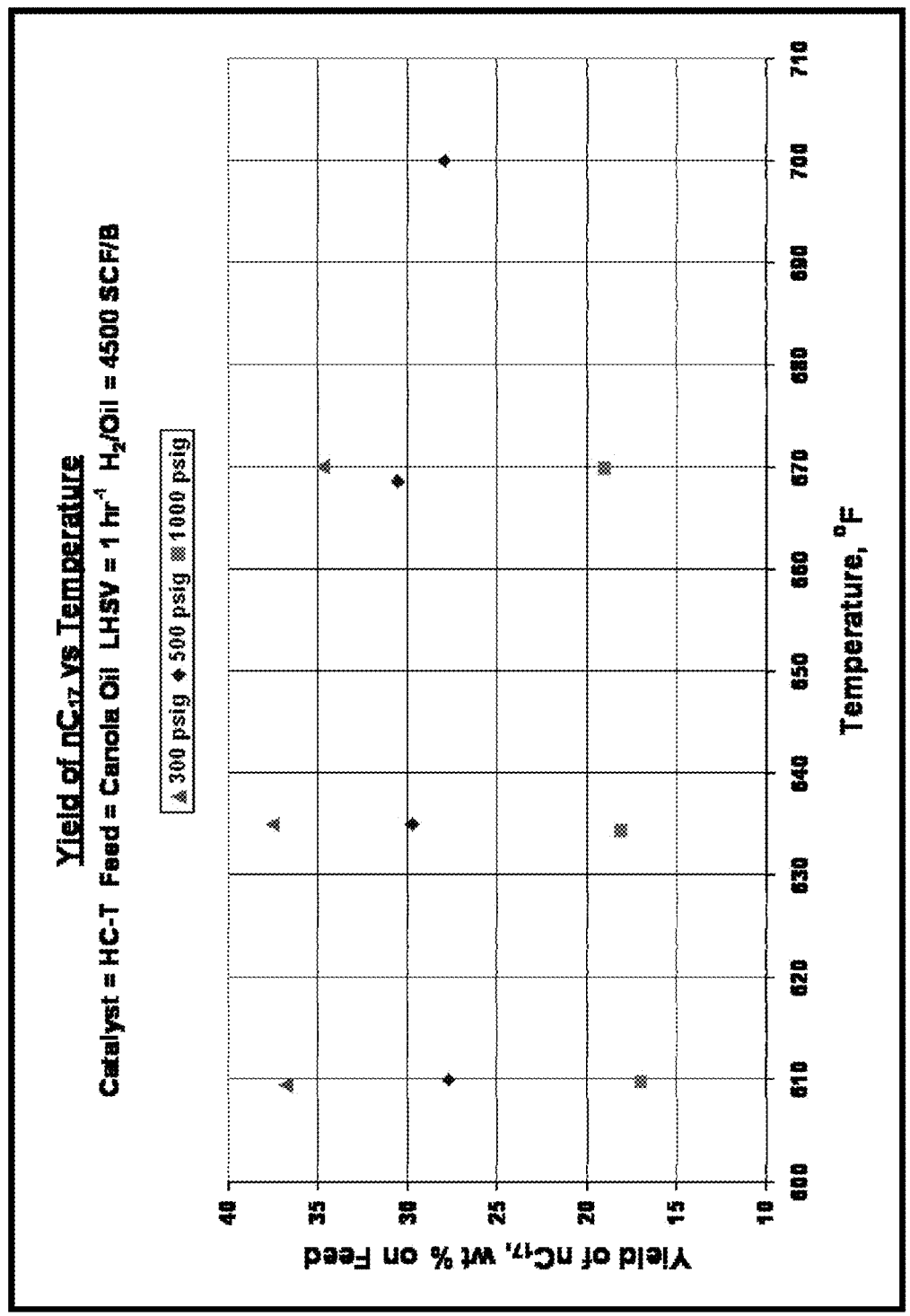
FIG. 2 is a plot of comparison data where oxygen content in the product is plotted versus hours on stream for a process having no recycle of hydrocarbon and for a process having a 4:1 volume ratio of recycle hydrocarbon to renewable feedstock.

A refined canola oil was processed at 1 LHSV in a downflow trickle bed reactor containing 200 cc of a promoted nickel-molybdenum on alumina catalyst. The canola oil was continuously added at a rate of 200 cc/hr or 1 LHSV over a period of 1000 hours. During the first 300 hours on stream, operating conditions were varied as shown in FIG. 2. The data shown in FIG. 2 demonstrated that a low operating pressure of 2068 kPa absolute (300 psia) was successful. For the next 700 hours, the process was operated at steady state at 3447 kPa absolute (500 psia) and 321 to 327° C. (610 to 620° F.). No hydrocarbon product was recycled to the reactor. The oxygen content of the product was periodically measured. After 750 hours on stream the level of oxygen in the product started to continuously increase indicating the catalyst had significantly deactivated and triglycerides were no longer sufficiently reacted.

Figure 3:
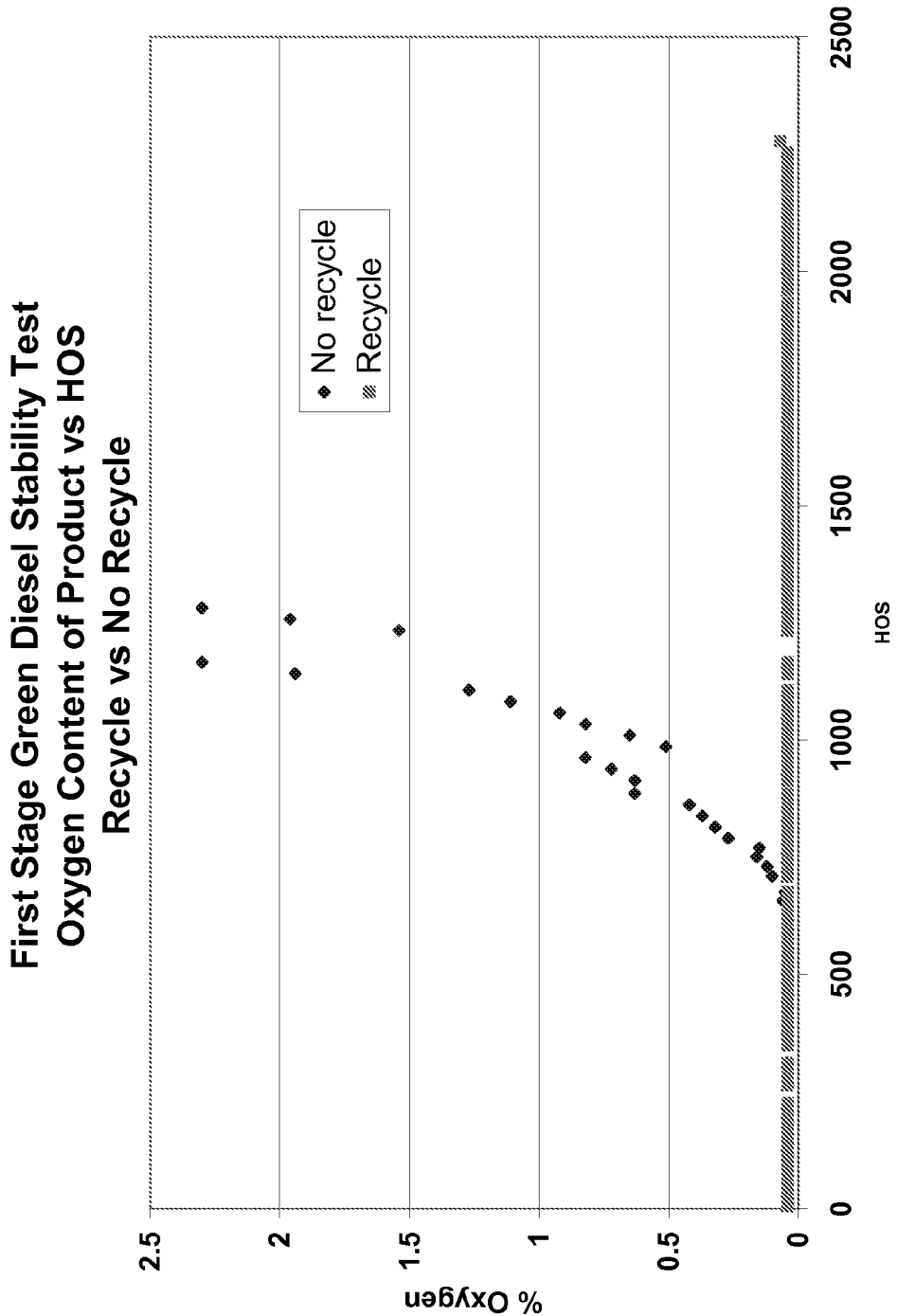
FIG. 3 is a plot of the results of nine different sets of operating conditions of the decarboxylation and hydrogenation reactor, with the yield of normal C17 as a weight percent of the feed being plotted against the temperature in degrees Fahrenheit.

The experiment was repeated with the same catalyst at steady state conditions of 3447 kPa absolute (500 psia) and 315° C. (600° F.). However, in this comparison experiment, hydrocarbon product was recycled to the reactor in a volume ratio of 4:1 recycle to feedstock ratio. Again, the oxygen content of the product was periodically measured. In this experiment, the catalyst remained very active for more than 2300 hours on stream and showed no signs of deactivation. FIG. 3 shows the results of the comparison experiment with the percent oxygen in the produce plotted against the hours on stream.

FIG. 3 shows that after about 700 hours on stream the product from the experiment with no recycle began to increase in oxygen content, indicating the catalyst was deactivating. In comparison, FIG. 3 also shows that the product from the experiment with a 4:1 recycle to feedstock volume ratio remains virtually free of oxygen.

The invention claimed is:

1. A process for producing a hydrocarbon product comprising paraffins having from about 8 to about 24 carbon atoms from a renewable feedstock comprising; treating the renewable feedstock in a reaction zone in the presence of hydrogen by hydrogenating and deoxygenating the renewable feedstock at reaction conditions to provide a reaction product comprising n-paraffins having from about 8 to about 24 carbon atoms, and recycling a portion of the reaction product to the reaction zone wherein the reaction zone is operated at a pressure in the range of about 1379 kPa absolute (200 psia) to about 4826 kPa absolute (700 psia); wherein the renewable feedstock further comprises at least one co-feed component selected from the group consisting of spent motor oils, spent industrial lubricants, used paraffin waxes, liquids derived from the gasification of coal followed by a downstream liquefaction step, liquids derived from the gasification of biomass followed by a downstream liquefaction step, liquids derived from the gasification of natural gas followed by a downstream liquefaction step, liquids derived from depolymerization, thermal or chemical, of waste plastics, and synthetic oils generated as byproducts from petrochemical and chemical processes.

2. The process of claim 1 further comprising isomerizing at least a portion of the hydrocarbon fraction by contacting the hydrocarbon fraction with an isomerization catalyst at isomerization conditions to isomerize at least a portion of the n-paraffins to branched-paraffins.

3. The process of claim 1 further comprising pre-treating the renewable feedstock in a pretreatment zone at pretreatment conditions to remove at least a portion of contaminants in the feedstock.

4. The process of claim 1 wherein excess hydrogen is recycled to the reaction zone.

5. The process of claim 1 where the renewable feedstock is hydrogenated and deoxygenated by contacting the renewable feedstock with a hydrogenation and deoxygenation catalyst at a temperature of about 200° C. to about 300° C. and a pressure of about 1379 kPa absolute (200 psia) to about 4826 kPa absolute (700 psia).

6. The process of claim 1 where deoxygenation comprises at least one of decarboxylation, decarbonylation, and hydro-deoxygenation.

7. The process of claim 1 further comprising treating a petroleum derived hydrocarbon feedstock in the reaction zone.

8. The process of claim 1 wherein the renewable feedstock is a biorenewable feedstock.

9. The process of claim 1 wherein the renewable feedstock comprises at least one component selected from the group consisting of canola oil, corn oil, soy oil, rapeseed oil, soybean oil, colza oil, tall oil, sunflower oil, hempseed oil, olive oil, linseed oil, coconut oil, castor oil, peanut oil, palm oil, mustard oil, cottonseed oil, inedible tallow, yellow and brown greases, lard, train oil, fats in milk, fish oil, algal oil, sewage sludge, ratanjoy oil, wild castor oil, jangli oil erandi oil, mohuwa oil, karanji honge oil, neem oil, and mixtures thereof.

10. A process for controlling the amount of paraffins having 17 carbon atoms in the product of a diesel boiling range fuel production process, said process for controlling comprising:

treating a renewable feedstock in a reaction zone by hydrogenating and deoxygenating the renewable feedstock at reaction conditions to provide a reaction product comprising a hydrocarbon fraction comprising n-paraffins useful as a diesel boiling range fuel; and recycling a portion of the hydrocarbon fraction to the reaction zone wherein the volume ratio of recycle to feedstock is in the range of about 2:1 to about 8:1;

wherein the reaction zone is operated at a pressure in the range of about 1379 kPa absolute (200 psia) to about 4826 kPa absolute (700 psia).

* * * * *